United States Patent
Kim et al.

(10) Patent No.: US 9,264,629 B2
(45) Date of Patent: Feb. 16, 2016

(54) SUPPRESSING FLICKER IN DIGITAL IMAGES

(71) Applicant: HEWLETT-PACKARD DEVELOPMENT COMPANY, L.P., Houston, TX (US)

(72) Inventors: Minwoong Kim, West Lafayette, IN (US); Jan P. Allebach, West Lafayette, IN (US); Kurt Robert Bengtson, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/560,780

(22) Filed: Dec. 4, 2014

(65) Prior Publication Data

US 2015/0085158 A1 Mar. 26, 2015

Related U.S. Application Data

(63) Continuation of application No. 13/771,991, filed on Feb. 20, 2013, now Pat. No. 8,934,030.

(51) Int. Cl.
*H04N 5/235* (2006.01)
*H04N 1/409* (2006.01)
*H04N 1/58* (2006.01)

(52) U.S. Cl.
CPC .............. *H04N 5/2357* (2013.01); *H04N 1/409* (2013.01); *H04N 1/4092* (2013.01); *H04N 1/58* (2013.01)

(58) Field of Classification Search
CPC ................ H04N 5/2357; H04N 5/235; G09G 2320/0247
See application file for complete search history.

(56) References Cited

U.S. PATENT DOCUMENTS

| 6,359,653 | B1 * | 3/2002 | Huang ..................... G09G 5/08 348/446 |
| 7,471,315 | B2 * | 12/2008 | Silsby .................... H04N 5/235 348/226.1 |
| 8,432,460 | B2 | 4/2013 | Nakasuji et al. |
| 8,890,975 | B2 * | 11/2014 | Baba .................... H04N 5/2357 348/226.1 |
| 2007/0046790 | A1 | 3/2007 | Nakasuji et al. |
| 2007/0091201 | A1 | 4/2007 | Sasaki |
| 2009/0167894 | A1 | 7/2009 | Nakaoka et al. |
| 2012/0002074 | A1 * | 1/2012 | Baba et al. ................. 348/228.1 |

OTHER PUBLICATIONS

Casadei, B. et al.; "Design and Characterization of a Fast CMOS Multiple Linear Array Imager for Nanosecond Light Pulse Detections", (Research Paper), Transactions on Instrument and Measurement; Dec. 2003; pp. 1892-1897; vol. 52, No. 6.

* cited by examiner

*Primary Examiner* — Ahmed A Berhan
(74) *Attorney, Agent, or Firm* — Hewlett-Packard Patent Department (57) ABSTRACT

Suppressing flicker in digital images includes deriving pixel values from a non-content area of a digital image, estimating flicker values within the non-content area, and suppressing flicker throughout the digital image based on the estimated flicker values of the non-content area.

20 Claims, 5 Drawing Sheets

SUPPRESSING FLICKER IN DIGITAL IMAGES

BACKGROUND

Digital photography uses an array of light sensitive sensors to capture an image. The captured image is stored as a digital file that can be transferred to other devices, displayed in a monitor, or printed. The digital image can be modified in its digital format to correct for errors, change the image's dimensions, remove unwanted portions of the image, change the brightness of the image, and to make other modifications.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Flicker is a phenomenon that occurs in digital images where rows in the image have visually discernible light increases and decreases alternating down or across the image. The flicker is caused when a digital camera takes multiple sub-frames individually at discrete time periods to form the overall image, and the ambient light during each discrete time period has different values. This generally occurs with cameras equipped with rolling shutters that capture images in the presence of light powered with alternating current.

The principles described herein include a method for suppressing flicker in digital images. Such a method includes deriving pixel values from a non-content area of a digital image, estimating flicker values within the non-content area, and suppressing flicker throughout the digital image based on the estimated flicker values of the non-content area. The principles described herein use less computation, memory, and scanning time to estimate and suppress flicker than other commercially available methods.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
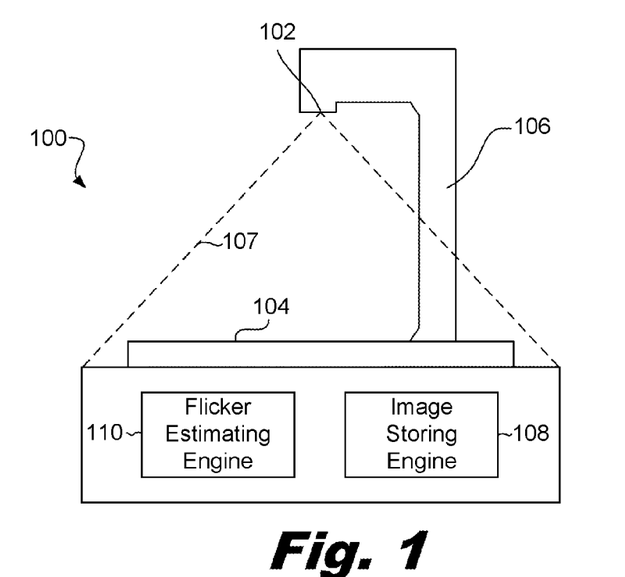
FIG. 1 is a diagram of an example of a digital photography system according to the principles described herein.

FIG. 1 is a diagram of an example of a digital photography system (100) according to the principles described herein. In this example, the digital photography system (100) includes a digital camera (102) that is positioned over a platen (104) where an object is placed to be photographed. The digital camera (102) is supported with a support arm (106) that extends to the platen (102).

A digital photography system (100) that is suitable to be used with the principles described herein includes the HP TopShot LaserJet Pro M275, which is available through Hewlett Packard headquartered in Palo Alto, Calif., U.S.A. However, any appropriate digital photography system (100) can be used in accordance with the principles described herein. For example, hand held digital cameras, scanners, copy machines, phones, other digital photography systems, or combinations thereof may be used.

Further, the light source that causes flicker to be exhibited in the digital image may be a light source that is incorporated into the digital photography system (100). For example, the digital photography system (100) may use a light source to illuminate an object within the camera's view (107) to provide sufficient light to capture an image of the object. The digital photography system (100) can use a flash or another type of light source to illuminate the object. In examples where the digital photography system's light source is powered with alternating current and the digital photography system (100) uses a shutter that causes more than one portion of the image to be captured at distinct time periods, the raw data image is likely to exhibit some flicker. Since alternating current has a power level that is constantly changing, the amount of light given off by the light source is also constantly changing. While often imperceptible to the natural eye in the ambient environment, alternating current light sources vary at such rapid rates that the different light levels given off during the different image scans occurring at discrete time periods cause each of the scanned portions of the digital image to have different intensities of light.

The light source that causes the flicker to be exhibited in the digital image may also come from light sources not incorporated into the digital photography system (100). For example, an image captured indoors can be affected by a light source that is powered by an alternating current. Further, other light sources, whether man made or naturally occurring, can cause at least some degree of flicker to be exhibited in the digital image.

In response to capturing a digital image of an object placed on the platen (104), the digital image is stored in an image storing engine (108) as a digital file. The image storing engine (108) may be incorporated into the hardware of the digital photography system (100) or the image storing engine (108) may be located at a remote site. The image storing engine (108) is in communication with a flicker estimating engine (110) that estimates flicker in the digital image. If the flicker estimating engine (110) detects the presence of flicker, a flicker estimating engine determines the amount of flicker in the digital image. In response to determining the amount of flicker in the digital image, an image suppression engine suppresses the flicker based on the determined flicker amount. The image suppression engine may be incorporated into the hardware of the digital photography system (100) or image suppression engine may be located at a remote location.

In some examples, the flicker estimating engine (110) automatically detects flicker in response to receiving a digital image file in the image storing engine (108). In other examples, the flicker estimating engine (110) estimates the flicker in response to a command from a user.

The flicker estimating engine (110) identifies a non-content area of the image that has a constant color reflectance to estimate the flicker value for the entire image. The non-content area of the image is a portion of the image that contains just a background. In other words, the non-content area is an area of the image that does not contain the photographed object. Because the rolling shutter of the digital camera takes multiple scans across or down the length of the image, the flicker is exhibited in rows that either traverse down or across the image. The entire scanned row is photographed at a single time interval and is therefore exposed to the same amount of light. As a consequence, the resulting flicker is consistent within each of the rows. The flicker estimating engine (110) determines the flicker value for the row by determining the flicker value of the row in the non-content area. Thus, in response to determining the flicker value in the non-content area, the flicker value for the content areas and the non-content areas can be suppressed.

The digital image file may be assigned pixel values according to a red, green, and blue (RGB) light color model. Thus, each pixel in the digital image has a red value component, a blue value component, and a green value component that are added together to produce the appropriate color for each pixel. The flicker estimating engine (110) separates the red, green, and blue value components to analyze the color values separately.

The average pixel values of the rows in the non-content area portions are plotted to form a curve that schematically represents the average pixel value recorded from the raw data of the digital image. Such a curve forms a wave because the rows with different flicker values alternate between different flicker values. A curve that represents just the pixel values without distortion from the flicker is formed by interpolating a line that connects mid-points between the local maximums and local minimums of the average pixel value curve. The ratio between the undistorted pixel value curve and the averaged pixel value curve are estimated to be the flicker value for the entire row, not just the flicker values for the non-content area. The undistorted pixel value curve, the average pixel value curve, and the corresponding flicker estimation and suppression will be described in more detail later.

Figure 2:
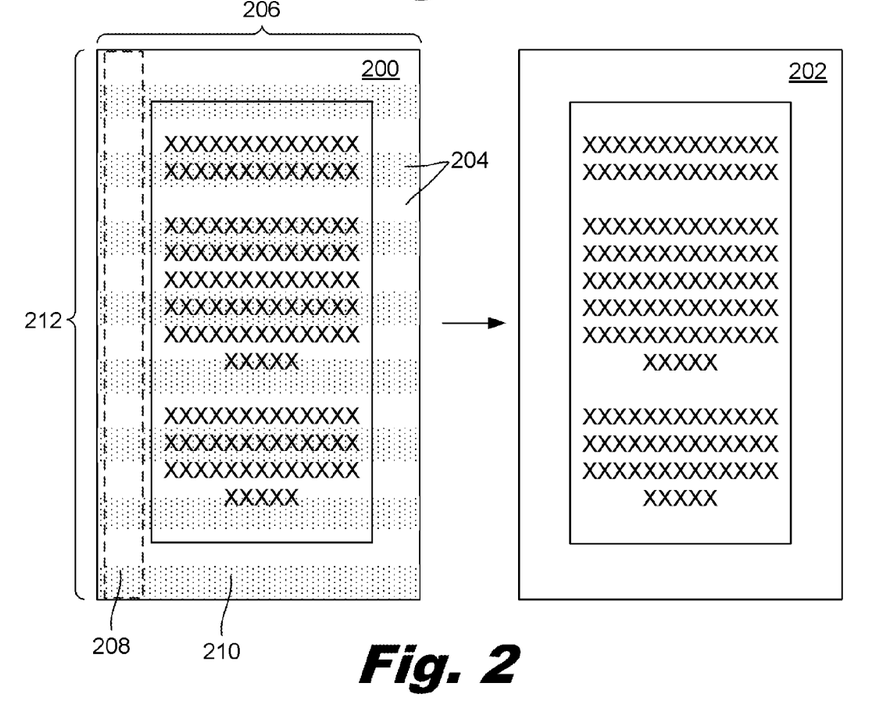
FIG. 2 is a diagram of an example of flicker suppression according to the principles described herein.

FIG. 2 is a diagram of an example of flicker suppression according to the principles described herein. In this example, a raw image (200) is converted to a flicker suppressed image (202). In the raw image (200), flicker rows (204) are generated across the entire width (206) of the raw image (200) such that the flicker rows (204) occupy space within both the non-content area (208) and the content area (210) of the raw image (200).

The flicker rows (204) each represent individual scanned portions of the raw image (200) that were taken at different times while capturing the overall image. A rolling shutter in the digital camera caused portions of the overall image to be scanned sequentially in a direction that travels down the length (212) of the raw image. However, each of the rows (204) has a different flicker value because the light present while each of the rows was scanned was different. Alternating current light sources that are either used to illuminate the image or merely present in the ambient environment often contribute to such flicker artifacts.

The non-content area (208) of the raw image (200) is a portion of the image that spans over at least some of the rows (204) that has a constant color reflectance. Generally, this portion of the raw image (200) is in the image's background. In some examples where the digital photography system (100, FIG. 1) has a fixed distance between the platen (104, FIG. 1) and the digital camera (102, FIG. 1), the camera's view (107, FIG. 1) may include a portion of the digital photography system (100, FIG. 1) that is off the platen (104, FIG. 1) to be a non-content area (208). Further, the non-content area (208) may include a portion of the platen (104, FIG. 1). In other examples, a portion of the object that has a constant color reflectance is designated as the non-content area (208). Such an example may include white space of a page that is placed on the platen (104, FIG. 1) to be photographed or another object that has a consistent color.

The flicker estimating engine (110, FIG. 1) can use a predetermined area of the raw image to be the non-content area (208). In other examples, the flicker estimating engine (110, FIG. 1) performs an analysis to determine which portions of the raw image (200) are suitable to be the non-content area. In yet other examples, the flicker estimating engine (110, FIG. 1) receives user input to select the non-content area (208). The non-content area (208) can span from a few pixels wide to hundreds or thousands of pixels wide. However, the non-content area (208) should include a portion of each row for which the flicker will be suppressed.

In some examples, a single non-content area is used to estimate and suppress the flicker. However, in other examples, multiple non-content areas that have consistent color reflectance that are used to make a collective non-content area (208). For example, where a raw image does not have a first non-content area that spans all of the rows, a second non-content area that includes rows omitted from the first non-content area can provide the data about the missing rows. In such examples, further processing may be done to account to inconsistent illumination and other factors that affect the accuracy of combining multiple non-content areas.

The flicker is estimated on a row by row basis. In response to estimating the flicker of the non-content area (208), the pixel values of each pixel in the row in both the non-content area (208) and the content area (210) are multiplied with the same scalar factor value to adjust the entire row. Each row is multiplied with a different scalar factor. As a consequence, the flicker suppressed image (202) will have the flicker significantly reduced or eliminated along its length (212). In examples where flicker remains visually detectable after running the flicker estimation and suppression processes, the processes are repeated to make further suppressions. In other examples, if some flicker remains visually detectable, the different processes are run to estimate and suppress the remaining flicker. In yet other examples, if some flicker remains, a different non-content area is selected and the flicker estimation and suppression processes are rerun.

Figure 3:
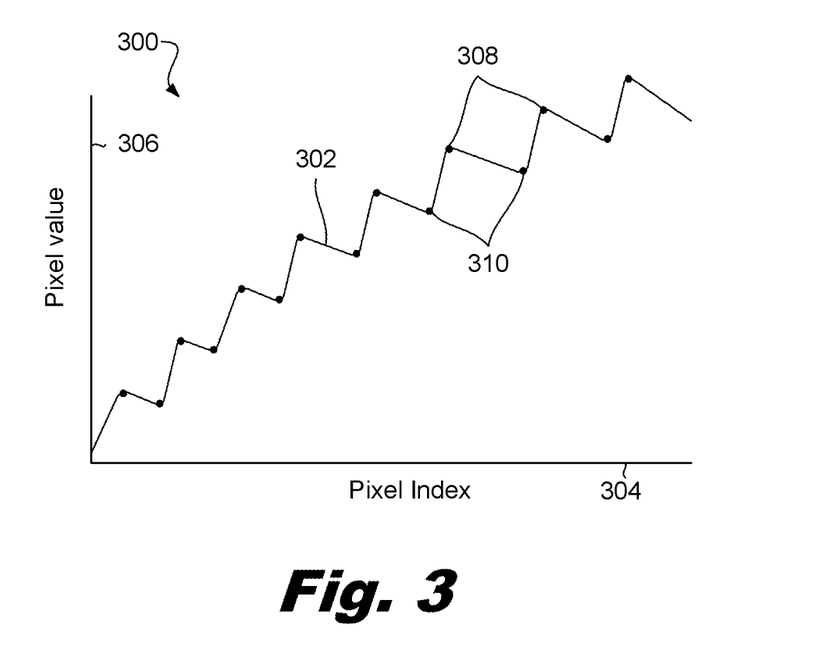
FIG. 3 is a chart of an example of an average pixel value curve according to the principles described herein.

FIG. 3 is a chart (300) of an example of an average pixel value curve (302) according to the principles described herein. In this example, the x-axis (304) schematically represents the pixel index, and the y-axis (306) schematically represents the pixel value. The average pixel value curve (302) represents a single color channel in the RGB color model. Each of the color channels are analyzed in the same manner and the results are combined at a later stage of processing.

In this example, the average pixel value curve (302) represents the average values of the pixels per row that are extracted from the raw image (200, FIG. 2). Further, the raw data of the average pixel value curve (302) has been filtered to reduce noise that interferes with finding the locations of local extremities, such as local maximums (308) and local minimums (310).

The local maximums (308) and the local minimums (310) of the noise-reduced average signal can be detected using a first-order difference signal (first-order derivative) of the filtered average signal with the following equation:

$$z^L_{NC}{}'(i)=(z^L_{NC}(i+\Delta i)-z_{NC}(i))/\Delta i, 0\le i\le l-\Delta i-1,$$

where $z^L_{NC}{}'(i)$ is the first-order difference signal of $z^L_{NC}(i)$ and $z^L_{NC}(i)$ represents the filtered average signal obtained with a moving average filter whose length is L, i represents a pixel coordinate in the vertical direction, l is the number of horizontal rows, and $\Delta i$ represents the increment number of pixels sampled in the equation. Such an equation identifies where the slope of the equation is approximately equal to zero, which identifies the locations of the local maximums (308) and the local minimums (310). Finding a location where the slope is exactly equal to zero may be time consuming, thus, the identification of approximately zero can be used.

The $\Delta i$ is precisely chosen because a number that is low will cause false alarms in finding regions of the curve where the slope is approximately zero. On the other hand, if $\Delta i$ is too large, the accuracy is reduced. Initial testing demonstrated that $\Delta i=10$ is sufficient for adequate flicker estimation.

Candidates for the local maximums (308) and local minimums (310) can be identified by thresholding the absolute value of the difference signal with a threshold close to zero. The set of the indices where the absolute difference values are less than a threshold H can be defined as $$l_o=\{i\mid \|z^L_{NC}{}'(i)\|<H\}$$

However, the threshold cannot accurately identify the candidates for the local maximums (308) and local minimums (310) of the filtered average signal for all images because low-luminance images have relatively small differences between the neighboring pixels compared to high-luminance images. Flickering of the ambient light source multiplicatively changes the pixel values of the scanned image because the luminance sensed by the imaging sensors of digital cameras is equal to the illumination coming from the ambient light multiplied by the surface reflectance of the target object being photographed. Therefore, the pixel-to-pixel difference in regions of high luminance is greater than the pixel-to-pixel difference in regions of low luminance, given a constant value for the surface reflectance. Consequently, the difference signal will have relatively small values in dark regions compared to bright regions. A modified equation that computes the difference signal in order that the same threshold can be applied to an image at any level of luminance is expressed as follows:

$$z^L_{NC}{}'(i)=(z^L_{NC}(i+\Delta i)-z^L_{NC}(i))/(z^L_{NC}(i+\Delta i)+z^L_{NC}(i)),$$
$$0\le i\le l-\Delta i-1,$$

This equation divides the difference between the two pixel values by the sum of those two values instead of by the distance between the two pixels. This spatial distance is just a constant that effectively has no impact when the computed difference signal is thresholded, but the difference divided by the sum indicates the change between the pixel values relative to the background luminance.

While this example is described with reference to specific equations and mechanisms for identifying the local maximums (308) and local minimums (310) of the filtered average signal, any appropriate equation or mechanism may be used in accordance with the principles described herein. Further, any appropriate mechanism or equation to filter the noise from the average pixel value curve may be used in accordance with the principles described herein.

Figure 4:
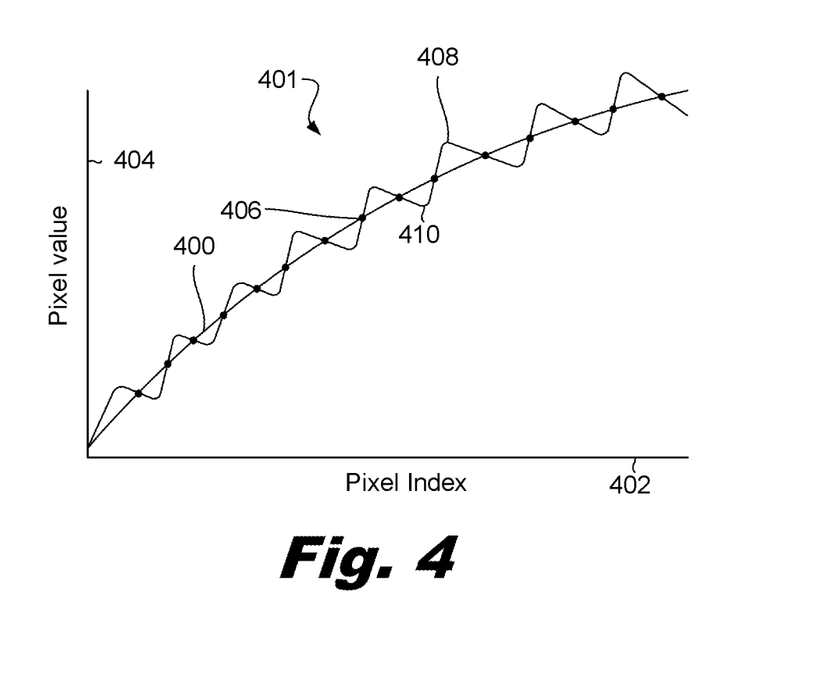
FIG. 4 is a chart of an example of an undistorted pixel value curve according to the principles described herein.

FIG. 4 is a chart (401) of an example of an undistorted pixel value curve (400) according to the principles described herein. In this example, the x-axis (402) schematically represents the pixel index, and the y-axis (404) schematically represents the pixel value. The undistorted pixel value curve (400) represents the pixel values without distortion caused by flicker. The undistorted pixel value curve (400) can be interpolated by connecting mid-points (406) between the local maximums (408) and local minimums (410).

The goal of interpolating the undistorted pixel value curve (400) is to determine a smooth function to be regarded as the spatial variation of the illumination in the rows in the absence of flicker. To accomplish this, the set of detected coordinates that exhibits approximately zero slope is clustered to define the local maximums (408) and local minimums (410). The k-th cluster of the local maximums (408) and local minimums (410) is expressed as the k-th true location as $C_k$ where k is numbered in ascending order of the distance from the origin of the i axis to the cluster. An ordered set $C_k=\{i^k_0, i^k_1, \ldots i^k_n, i^i_{n+1}\}$ whose elements are also in the ascending order of i satisfies the following criterion:

$$C_k\{i^k_m, i^k_{n+1}\mid \|i^k_{n+1}-i^k_n(i)\|\le \Delta i/2, \text{ and } i^k_m, i^i_{n+1}\in l_o\}$$

where $\Delta i$ is the increment of pixel index.

The clusters represent the locations where the pixel values are maximally amplified or attenuated by the flicker. On the other hand, the pixel values are expected to be minimally affected by the flicker midway between two neighboring clusters. Accordingly, we assume that the pixel value at the mid-point (406) between two neighboring clusters is undistorted by the flicker, and at this point the multiplicative scale factor accounting for the increase or decrease by the flicker artifact is unity. The location of the k-th mid-point between clusters $C_k$ and $C_{k+1}$ can be computed as $$m_k = (\max\{C_k\} + \min\{C_{k+1}\})/2,$$

or $$m_k = 1/(2|C_k|)\sum_{i\in C_k} i + 1/(2|C_{k+1}|)\sum_{i\in C_{k+1}} i$$

The first equation defines the mid-point (406) as the point located halfway between the end point of a left cluster and a start point of a right cluster. On the other hand, the second equation defines the mid-point as the point located midway between centroids of the left and right clusters. In the experimental results, no significant difference was observed in the quality of the flicker-reduced images that resulted from the use of either of these two equations to compute the mid-points. The mid-points are used as the knots for the interpolation process.

In some examples, cubic spline interpolation is used to form the undistorted pixel value curve (400). However, any appropriate interpolation technique may be used in accordance with the principles described herein. During initial testing, the knots are set to the mid-points between the clusters representing the local maximums (408) and local minimums (410) to draw a smooth curve corresponding to the pixel values in the absence of distortion from flicker. Without setting the end knots, unexpected splines can be obtained for the intervals outside the first mid-point and outside the last mid-point. That is because the left knot does not exist at the left end of the interval outside the first mid-point and the right knot does not exist at the right end of the interval outside the last mid-point. Adding the first index (i=0) and last index ($i=l-1$) of $i$ to the set of knots prevents this issue from occurring. The alternative set of knots for the cubic spline interpolation is $$K=\{0,m_o,\ldots,m_k,\ldots,l-1\}$$

Then the cubic-spline-interpolated curve can be obtained as $$s(i)=\mathrm{spline}(K,z^L{}_{NC}(K),i),0\le i\le l-\Delta i-1,$$

where spline ( ) is the cubic spline interpolator having three input arguments: the set of pixel indexes of knots, the set of pixel gray values of the noise-reduced average signal at the knots, and the pixel index or indices where the signal is to be interpolated.

While this example has been described with reference to specific mechanisms and equations for determining the mid-points, any appropriate mechanism or equation for determining the mid-points may be used. Further, while this example is described with reference to specific mechanisms and equations for creating an undistorted pixel value curve, any appropriate mechanism or equation may be used in accordance with the principles described herein.

Figure 5:
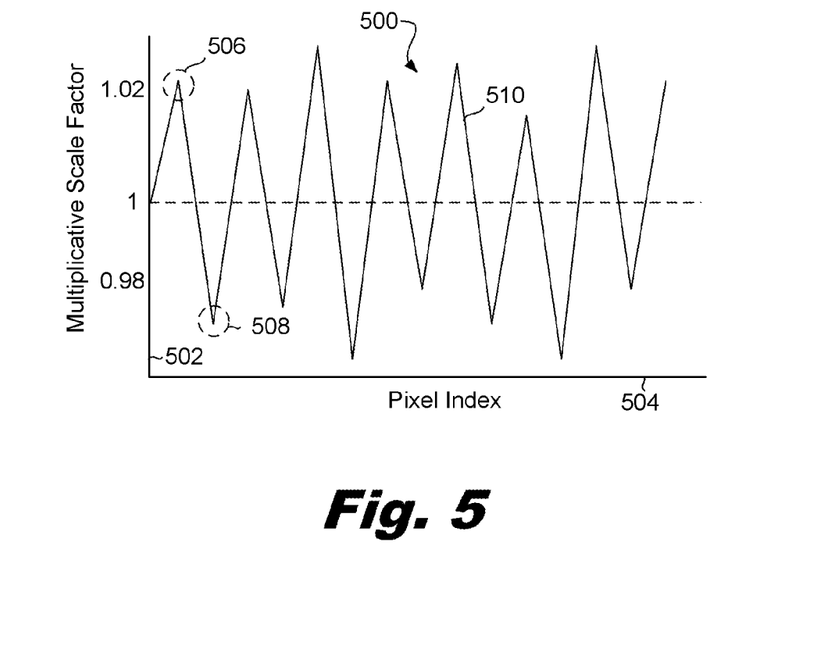
FIG. 5 is a chart of an example of estimated flicker according to the principles described herein.

FIG. 5 is a chart (500) of an example of estimated flicker according to the principles described herein. In this example, the x-axis (502) schematically represents the pixel index, and the y-axis (504) schematically represents a multiplicative scalar factor.

The estimated flicker is an array of multiplicative scale factors given by the ratio of components in the average pixel value curve (302, FIG. 3) computed from the non-content area and the components of the undistorted pixel value curve (400, FIG. 4). Therefore, the multiplicative model of the estimated flicker signal is given by:

$$f(i)=(Y_{NC}(i))/s(i),0\le i\le l-1,$$

where $Y_{NC}(i)$ is the average pixel value taken along the scan direction of the non-content area. Thus, the estimated f(i) can be interpreted as the amount of multiplicative amplification or attenuation of the pixel value at the i-th row caused by the flicker.

The peaks (506) and valleys (508) of the curve (510) schematically represent the value of the multiplicative scale factor for each of the rows. In response to estimating the flicker of the non-content area, the flicker can be suppressed globally across the entire flicker distorted image. Each of the rows is divided by its corresponding multiplicative scale factor f(i) to cause the row's pixels to display pixel values that are undistorted by flicker. Therefore, the suppression process can be implemented as $$\hat{y}(i,j)=y(i,j)/f(i) 0\le i\le l-1, 0\le j\le J-1,$$

where j represents the coordinate in the horizontal direction, J represents the number of vertical rows, and $\hat{y}$ (i, j) represents an estimate of the flicker-suppressed image.

While this example has been described with reference to specific mechanisms and equations for estimating flicker, any appropriate mechanism and/or equation may be used to estimate flicker. Further, while this example has been described with reference to specific ways to suppress flicker, any appropriate mechanism for suppressing the flicker throughout the image may be used in accordance with the principles described herein.

Figure 6:
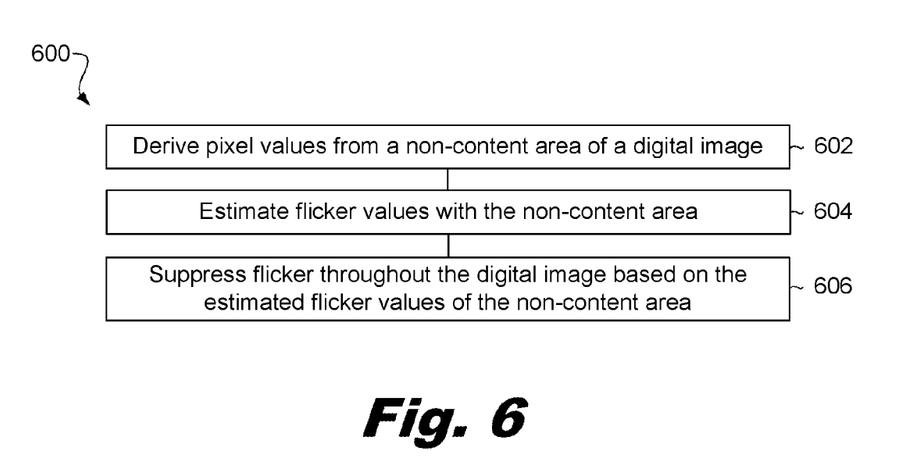
FIG. 6 is a diagram of an example of a method for suppressing flicker in digital images according to the principles described herein.

FIG. 6 is a diagram of an example of a method (600) for suppressing flicker in digital images according to the principles described herein. In this example, the method (600) includes deriving (602) pixel values from a non-content area of a digital image, estimating (604) flicker values with the non-content area, and suppressing (606) flicker throughout the digital image based on the estimated flicker values of the non-content area.

Estimating the flicker values within the non-content area may include analyzing each of the color channels of a RGB color model of the pixel values individually. Further, an average pixel value curve can be determined that maps the pixel values averaged along a direction perpendicular to the flicker within the non-content area for each of the color channels. In such an average pixel value curve, the local maximums and local minimums are identified and the undistorted pixel value curve is interpolated by connecting mid-points between the local maximums and local minimums. Accordingly, the pixel values are adjusted across the entire width of each row based on the estimated flicker in the non-content area. Thus, the flicker estimated in the non-content area is used for suppressing flicker in both the non-content area and the content areas of the image.

Figure 7:
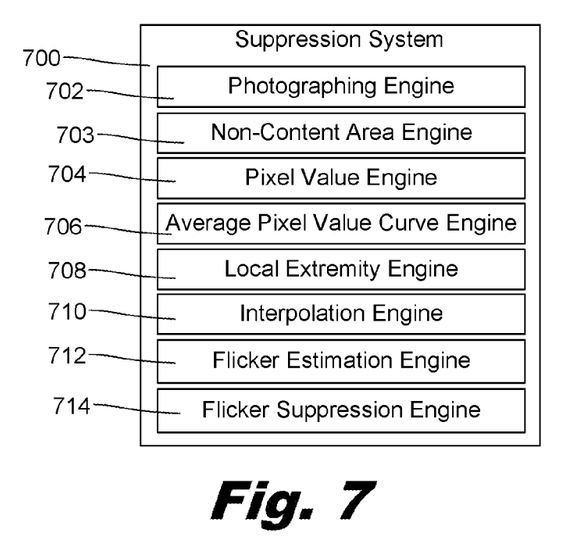
FIG. 7 is a diagram of an example of a flicker suppression system according to the principles described herein.

FIG. 7 is a diagram of an example of a flicker suppression system (700) according to the principles described herein. The flicker suppression system (700) includes a photographing engine (702), a non-content area engine (703), a pixel value engine (704), an average pixel value curve engine (706), a local extremity engine (708), an undistorted pixel value engine (710), a flicker estimation engine (712), and a flicker suppression engine (714). The engines (702, 703, 704, 706, 708, 710, 712, 714) refer to a combination of hardware and program instructions to perform a designated function. Each of the engines (702, 703, 704, 706, 708, 710, 712, 714) may include a processor and memory. The program instructions are stored in the memory and cause the processor to execute the designated function of the engine.

The photographing engine (702) captures an image of an object. The non-content area engine (703) determines the non-content area of the raw digital image by locating a portion of the image that spans all of the rows affected by flicker that has a constant color reflectance. The pixel value engine (704) determines the pixel values from the image's raw data stored in an image file. The average pixel value curve engine (706) determines a curve that depicts the relationship between the average pixel values per row and the location of the pixels. The local extremity engine (708) indentifies the local maximums and the local minimums on the average pixel value curve.

The interpolation engine (710) determines a curve that represents the value of the pixels without distortion caused by flicker. The interpolation engine (710) may interpolate the curve that intersects the mid-points between the local maximums and the local minimums on the average pixel value curve. The flicker estimation engine (712) estimates the flicker based on the undistorted curve relationship to the average pixel value curve. The flicker estimation engine (712) generates a scale factor value for each of the rows of the captured image. The flicker suppression engine (714) suppresses the flicker in each row. The flicker suppression engine (714) suppresses the flicker across both the non-content areas and the content areas of each row. The flicker suppression engine (714) divides the scale factor value determined with the flicker estimation engine (712) by the pixel values of each row to suppress the flicker.

Figure 8:
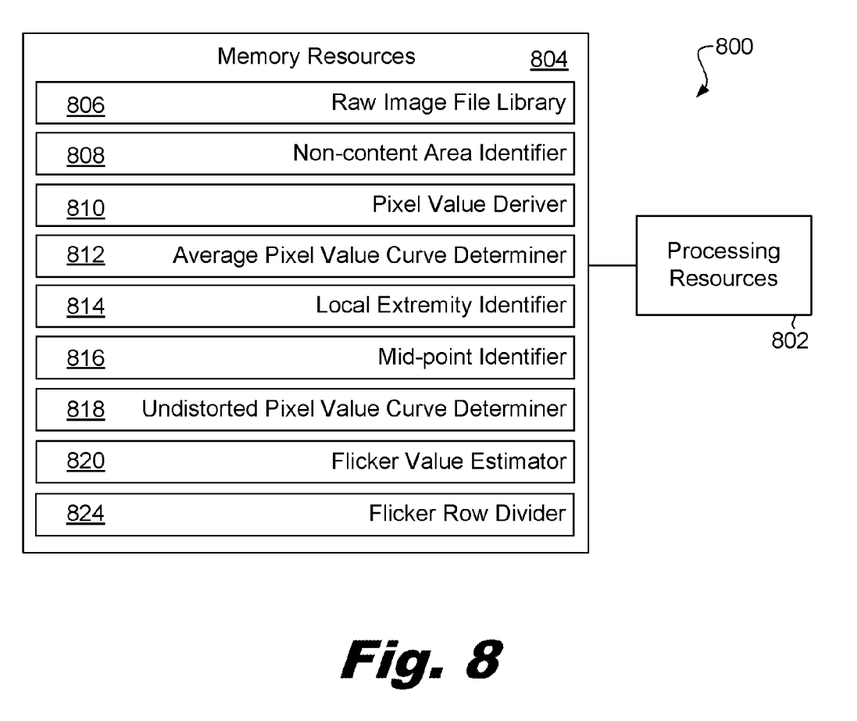
FIG. 8 is a diagram of an example of a flicker suppression system according to the principles described herein.

FIG. 8 is a diagram of an example of a flicker suppression system (800) according to the principles described herein. In this example, the flicker suppression system (800) includes processing resources (802) that are in communication with memory resources (804). Processing resources (802) include at least one processor and other resources used to process programmed instructions. The memory resources (804) represent generally any memory capable of storing data such as programmed instructions or data structures used by the flicker suppression system (800). The programmed instructions shown stored in the memory resources (804) include a non-content area identifier (808), a pixel value deriver (810), an average pixel value curve determiner (812), local extremity identifier (814), a mid-point identifier (816), an undistorted pixel value curve determiner (818), a flicker value estimator (820), a scale factor determiner (822), and a flicker row divider (824). The data structures shown stored in the memory resources (804) include a raw image file library (806).

The memory resources (804) include a computer readable storage medium that contains computer readable program code to cause tasks to be executed by the processing resources (802). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, or types of memory, or combinations thereof.

The non-content area identifier (808) represents programmed instructions that, when executed, cause the processing resources (802) to identify a non-content area of an image from the raw image file library (806). The pixel value curve deriver (810) represents programmed instructions that, when executed, cause the processing resources (802) to derive the pixel rows of each row within the non-content area. The average pixel value curve determiner (812) represents programmed instructions that, when executed, cause the processing resources (802) to average the pixels per row and to plot the average pixel values to make an average pixel value curve.

The local extremity identifier (814) represents programmed instructions that, when executed, cause the processing resources (802) to identify the local maximums and local minimums of the average pixel value curve. The local extremity identifier (814) may determine the locations of the average pixel value curve that have approximately zero slope to identify the locations of the local maximums and local minimums. In some examples, just selected pixel coordinates along the average pixel value curve are evaluated to determine their slopes. In such examples, a coordinate with zero slope may be difficult identify. In such examples, the adjacent selected coordinates are clustered together and collectively function as either a local maximum or local minimum.

The mid-point identifier (816) represents programmed instructions that, when executed, cause the processing resources (802) to identify the mid-points between the local maximums or local minimums. The undistorted pixel value curve determiner (818) represents programmed instructions that, when executed, cause the processing resources (802) to determine an undistorted pixel value curve by forming a curve that intersects the mid-points of the average pixel value curve. The flicker value estimator (820) represents programmed instructions that, when executed, cause the processing resources (802) to estimate the flicker value based on the ratios between the average pixel value curve and the undistorted pixel value curve. The flicker row divider (824) represents programmed instructions that, when executed, cause the processing resources (802) to divide each row's flicker values by the corresponding scale factors. Such division adjusts the pixels in the digital image to be a value that is undistorted by the flicker value. Such adjustments suppress the flicker throughout the image.

Further, the memory resources (804) may be part of an installation package. In response to installing the installation package, the programmed instructions of the memory resources (804) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (802) and the memory resources (804) are located within the same physical component, such as a server, or a network component. The memory resources (804) may be part of the physical component's main memory, caches, registers, non-volatile memory, or elsewhere in the physical component's memory hierarchy. Alternatively, the memory resources (804) may be in communication with the processing resources (802) over a network. Further, the data structures, such as the libraries and may be accessed from a remote location over a network connection while the programmed instructions are located locally. Thus, the flicker suppression system (800) may be implemented on a user device, on a server, on a collection of servers, or combinations thereof.

The flicker suppression system (800) of FIG. 8 may be part of a general purpose computer. However, in alternative examples, the flicker suppression system (800) is part of an application specific integrated circuit.

Figure 9:
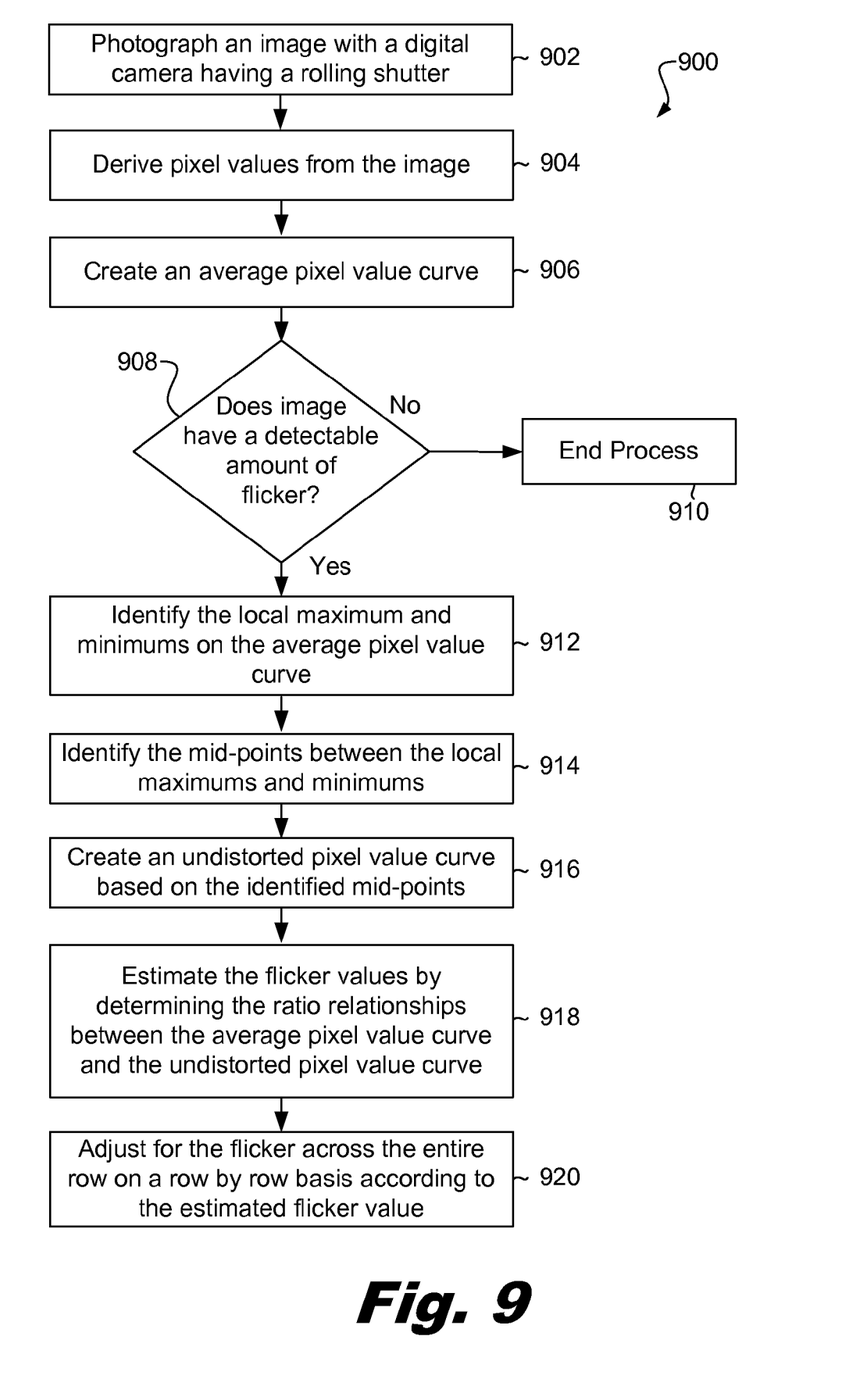
FIG. 9 is a diagram of an example of a flowchart of a process for suppressing flicker in digital images according to the principles described herein.

FIG. 9 is a diagram of an example of a flowchart (900) of a process for suppressing flicker in digital images according to the principles described herein. In this example, the process includes photographing (902) an image with a digital camera having a rolling shutter deriving (904) pixel values from the image and creating (906) an average pixel value curve.

The process also includes determining (908) whether the image has a detectable amount of flicker. If there is no detectable amount of flicker, the process ends (910). On the other hand, if flicker is detected, the process includes identifying (912) the local maximums and local minimums on the average pixel value curve. The mid-points between the local maximums and local minimums are also identified (914) and an undistorted pixel value curve is created (916) by forming a curve that connects the identified mid-points.

The flicker values are estimated (918) by determining ratio relationships between the average pixel value curve and the undistorted pixel value curve. The process also includes adjusting (920) the flicker across the entire row on a row by row basis according to the estimated flicker value. In some examples, the flicker is adjusted on a row by row basis by dividing the row's pixel values by a scale factor determined for each row that causes the pixels to have a value that is undistorted by the flicker.

While the examples above have been described with reference to specific mechanisms for capturing a digital image, any appropriate mechanism for capturing an image may be used in accordance with the principles described herein. For example, the digital image may be taken with a HP TopShot LaserJet device as described above, a mobile phone, a digital camera, a scanning device, another digital photography system, or combinations thereof. Further, while the examples above have been described with reference to specific kinds of non-content areas and specific mechanisms for identifying the non-content areas, any mechanism for identifying a non-content area or type of non-content area may be used in accordance with the principles described herein.

While the examples above have been described with reference to specific mechanisms for detecting flicker, any appropriate mechanism for detecting flicker may be used in accordance with the principles described herein. While the examples above have been described with reference to specific curves for estimating the flicker, any appropriate variations to these curves in accordance with the principles described herein may be used. Further, while the examples above have been described with reference to specific ratios for creating multiple scales, any appropriate relationship may be used to derive a mechanism for adjusting the flicker. Also, while the examples above have been described with reference to specific mechanisms for estimating and suppressing flicker, any appropriate mechanisms for estimating and suppressing flicker may be used.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method of reducing flicker in digital images, comprising:
    estimating flicker values within a first area of a digital image, wherein the first area of the digital image is a non-content area of the digital image in which only a background is visible, wherein estimating flicker values within a first area of a digital image comprises:
        with a calculating engine, generating an average pixel value curve comprising a plurality of average pixel values for a number of linear arrangements of pixels in the first area of the digital image;
        identifying a number of local maximums and a number of local minimums on the average pixel value curve;
        with the calculating engine, generating an undistorted pixel value curve interpolated from midpoints between the local maximums and the local minimums; and
        determining a number of ratio relationships between the average pixel value curve and the undistorted pixel value curve to obtain the estimated flicker values; and
    reducing flicker in a second area of the digital image based on the estimated flicker values of the first area.

2. The method of claim 1, wherein the first area has a consistent color.

3. The method of claim 1, wherein flicker in the digital image is patterned.

4. The method of claim 3, wherein flicker in the digital image is linear.

5. The method of claim 3, wherein flicker in the digital image is periodic.

6. The method of claim 1, wherein estimating flicker values within the first area of a digital image includes estimating flicker values using a component of pixels located in the first area of the digital image, where the component is selected from a group comprising: red value component, green value component, and blue value component.

7. The method of claim 1, wherein reducing flicker in the second area of the digital image based on the estimated flicker values of the first area includes extrapolating flicker values for the second area of the digital image from estimated flicker values within the first area of the digital image.

8. The method of claim 7, wherein reducing flicker in the second area of the digital image based on the estimated flicker values of the first area includes modifying the second area of the digital image using the extrapolated flicker values for the second area.

9. A system for adjusting for flicker in digital images, comprising:
    a calculating engine to calculate flicker values within a first portion of a digital image, wherein the first portion of the digital image has a constant color and is within a non-content area of the digital image;
    an adjusting engine to adjust a second portion of the digital image based on the calculated flicker values of the first portion of the digital image, and
    in response to a determination that a number of flicker artifacts remain in the digital image after adjusting the second portion of the digital image based on the calculated flicker values of the first portion of the digital image, selecting at least a third portion of the digital image that has the constant color and is within the non-content are of the digital image different from the first portion, and calculating the flicker values of the flicker artifacts based on the third portion.

10. The system of claim 9, wherein the calculating engine calculates an average pixel value for a linear arrangement of pixels in the first portion of the digital image.

11. The system of claim 10, wherein the calculating engine generates a curve comprising a plurality of average pixel values for linear arrangements of pixels in the first portion of the digital image.

12. The system of claim 11, wherein the calculating engine calculates local contributions to the curve.

13. The system of claim 12, wherein the calculating engine extrapolates a local contribution to the curve to a second area of the digital image that is in line with the linear arrangement of pixels used to calculate the local contribution.

14. A computer program product for diminishing flicker in digital images, comprising:
    a non-transitory computer readable storage medium, the non-transitory computer readable storage medium comprising computer readable program code embodied therewith, the computer readable program code comprising program instructions that, when executed, causes a processor to:
        for at least one linear region of pixels of a plurality of pixels within a digital image, the digital image comprising content areas and non-content areas, average the plurality of pixels from the linear region to produce an average pixel value for the linear region, wherein the at least one linear region of pixels is part of a non-content area of the digital image in which only a background, and not any foreground object, is visible and comprises at least a portion of each of a number of flicker artifacts, the digital image being captured during a plurality of separate sub-frames subjected to different ambient light values, and the at least one linear region being perpendicular to the flicker artifacts;
        determine a flicker value of the flicker artifacts by:
            identifying a number of local maximums and a number of local minimums on the average pixel value for the linear region, the local maximums and local minimums forming an average pixel value curve;
            identifying a number of midpoints between the local maximums and the local minimums to form an undistorted pixel value curve interpolated from the midpoints; and
            determining a number of ratio relationships between the average pixel value curve for the linear region and the undistorted pixel value curve for the linear region to obtain the flicker value; and adjust the number of flicker artifacts within the digital image based on the flicker value.

15. The computer program product of claim 14, further comprising computer readable program code comprising program instructions that, when executed, cause the processor to generate a curve representing the pixel values without flicker in a portion of the non-content area.

16. The computer program product of claim 15, wherein the curve is generated using a middle portion of a range of pixel values produced by flicker.

17. The computer program product of claim 14, wherein the average pixel value curve and undistorted pixel value curve are determined for each of a red value component, a blue value component, and a green value component.

18. The computer program product of claim 14, wherein the at least one linear region comprises a plurality of linear regions, the plurality of linear regions comprising consistent color reflectance and collectively spans all flicker artifacts.

19. The computer program product of claim 14, wherein, if a number of the flicker artifacts remain, after adjusting the number of flicker artifacts within the digital image based on the flicker value, selecting at least one different linear region and determining the flicker value of the flicker artifacts.

20. The computer program product of claim 14, wherein identifying the number of local maximums and the number of local minimums on the average pixel value for the linear region comprises filtering noise to find the local maximums and the local minimums.

\* \* \* \* \*